US009446526B2

(12) United States Patent
Sun (10) Patent No.: US 9,446,526 B2
(45) Date of Patent: Sep. 20, 2016

(54) LOADING DEVICE HAVING SUCTION ASSEMBLIES WITH ADJUSTABLE INTERSPACES THEREAMONG

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventor: Peng-Fei Sun, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/713,593

(22) Filed: May 15, 2015

(65) Prior Publication Data
US 2016/0075035 A1    Mar. 17, 2016

(30) Foreign Application Priority Data

Sep. 15, 2014 (CN) .......................... 2014 1 0467647

(51) Int. Cl.
*B25J 15/06* (2006.01)
*B25J 15/00* (2006.01)

(52) U.S. Cl.
CPC ......... *B25J 15/0616* (2013.01); *B25J 15/0061* (2013.01); *Y10S 901/40* (2013.01)

(58) Field of Classification Search
CPC ............. B25J 15/0616; B25J 15/0061; Y10S 901/40; B66C 1/0237; B66C 1/0243; B65B 21/20

USPC ............ 294/188, 65; 198/468.3; 414/416.02
See application file for complete search history.

(56) References Cited

U.S. PATENT DOCUMENTS

| 3,542,412 | A * | 11/1970 | Koch ...................... B65B 23/08 198/418.7 |
| 6,439,631 | B1 * | 8/2002 | Kress .................... B65G 47/918 294/65 |
| 7,029,046 | B2 * | 4/2006 | Lim ......................... B23Q 7/04 294/188 |
| 7,850,217 | B2 * | 12/2010 | Lo ....................... G01R 31/2893 198/460.2 |
| 7,954,869 | B2 * | 6/2011 | Shim ................. H01L 21/68707 198/468.3 |
| 2007/0152458 | A1 * | 7/2007 | Guidetti ................... B65B 5/12 294/188 |

FOREIGN PATENT DOCUMENTS

| JP | S53119180 A | 10/1978 |
| JP | H05229650 A | 9/1993 |
| JP | H0733246 A | 2/1995 |

\* cited by examiner

*Primary Examiner* — Gabriela Puig
(74) *Attorney, Agent, or Firm* — Zhigang Ma (57) ABSTRACT

A loading device of a robot includes a frame, a first pneumatic cylinder and a first pulley member mounted on a top face of the frame, a second pneumatic cylinder and a second pulley member mounted on a bottom face of the frame, first and second suction assemblies coupled to the first pneumatic cylinder and the first pulley member, third and fourth suction assemblies coupled to the second pneumatic cylinder and the second pulley member, and a fifth suction assembly secured to a middle of the frame. Interspaces among the first to fifth suction assemblies are adjustable by activating the first and second pneumatic cylinder to extend or retract pistons thereof.

15 Claims, 6 Drawing Sheets

LOADING DEVICE HAVING SUCTION ASSEMBLIES WITH ADJUSTABLE INTERSPACES THEREAMONG

CROSS-REFERENCE TO RELATED APPLICATIONS

This application claims priority to Chinese Patent Application No. 201410467647.5 filed on Sep. 15, 2014, the contents of which are incorporated by reference herein.

FIELD

The subject matter herein generally relates to an automatic loading device for moving workpieces to be processed by a machine center, wherein a spacing between two neighboring suction assemblies of the loading device is adjustable so that the loading device can upload workpieces with different sizes.

BACKGROUND

Following the advancement of automation of machining, automatic loading devices for transferring workpieces from one site to another site to be processed by a machine become more and more popular. The workpieces can be die-cast products such as die-cast shells for smart phones. The one site can be a mold in which the die-cast products are formed. The machine can be a milling machine center for removing gates from the die-cast products.

Since the production trend of the die-cast products is small-volume production of a wide range of different items, an easy and quick adjustment of the spacing between the suction assemblies of the loading device becomes a requirement.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the present loading device. Moreover, in the drawings, like reference numerals designate corresponding parts throughout the several views.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or other word that substantially modifies, such that the component needs not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like.

Figure 1:
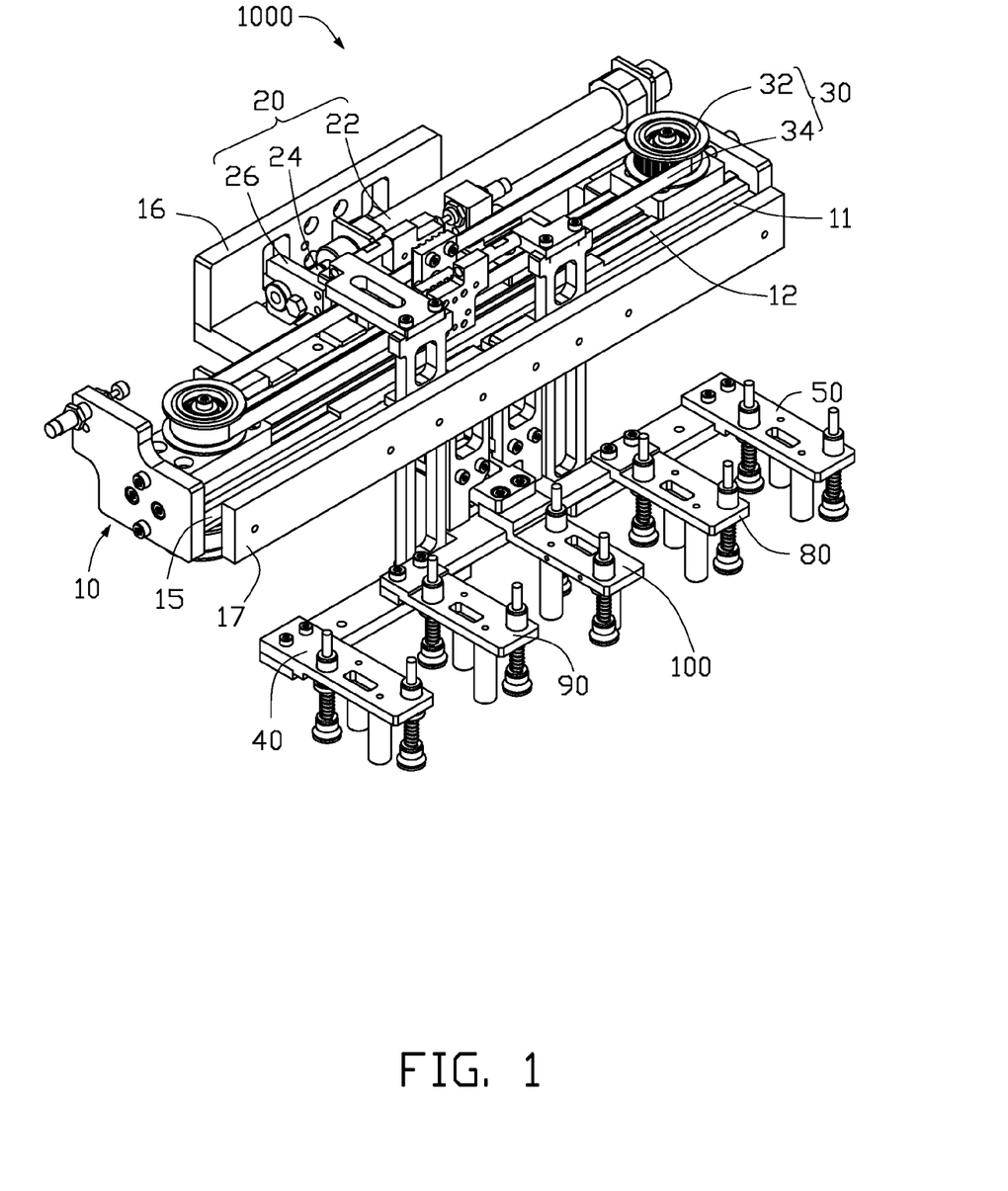
FIG. 1 is a front-top-left perspective view of a loading device in accordance with the present disclosure.
Figure 2:
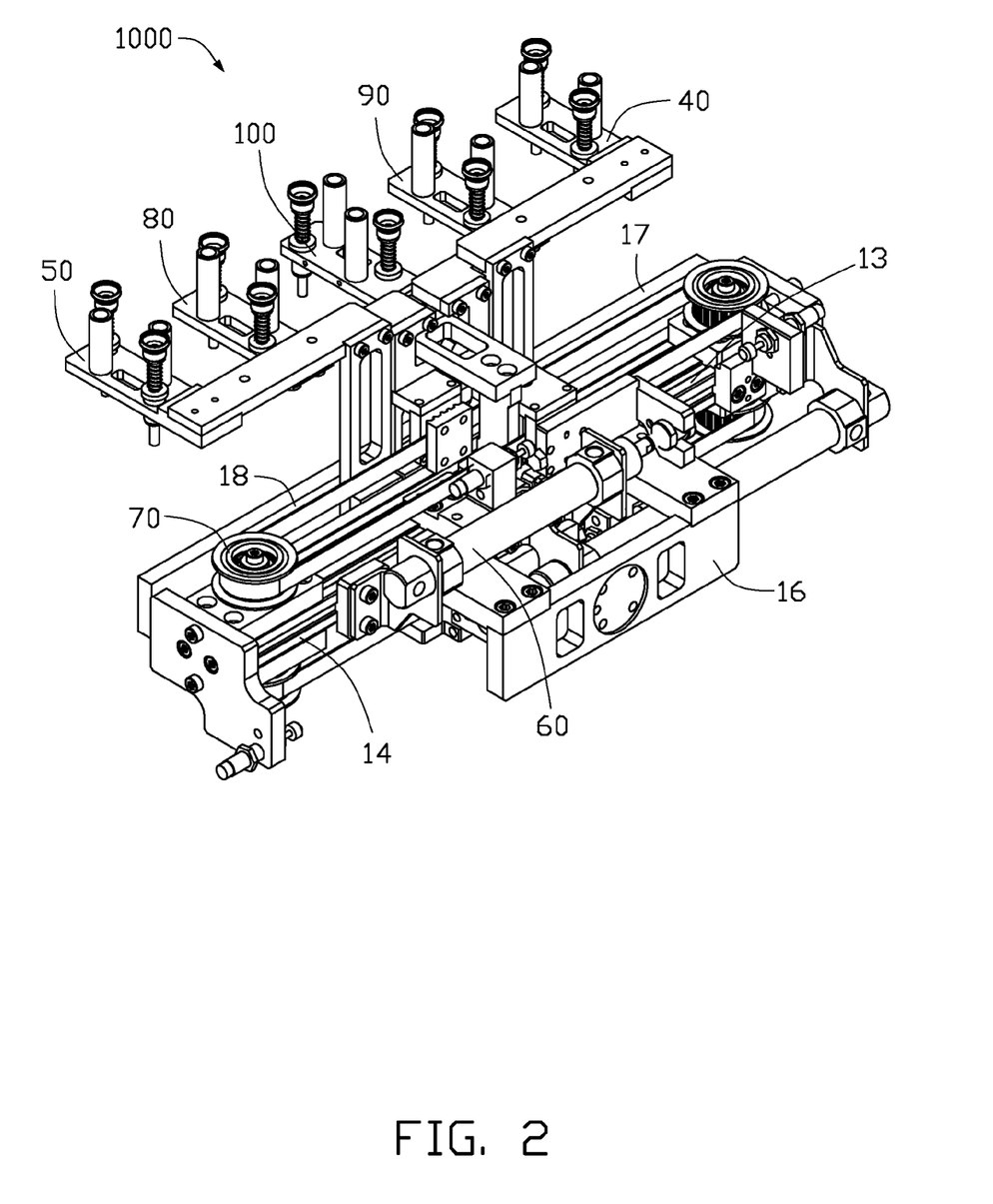
FIG. 2 is a view similar to FIG. 1, viewed from a rear-bottom-right aspect.

Referring to FIGS. 1 and 2, a loading device 1000 for moving a plurality of workpieces (not shown) from one site to another site to be, for example, machined by a machine center (not shown) includes a frame 10, a first pneumatic cylinder 20, a first pulley member 30, a first suction assembly 40, a second suction assembly 50, a second pneumatic cylinder 60, a second pulley member 70, a third suction assembly 80, a fourth suction assembly 90 and a fifth suction assembly 100. The first and second pneumatic cylinders 20, 60, the first and second pulley members 30, 70 and the fifth suction assembly 100 are securely coupled to the frame 10, while the first, second, third and fourth suction assemblies 40, 50, 80, 90 are moveably coupled to the frame 10.

The first pneumatic cylinder 20 and the first pulley member 30 are fixed on a top side of the frame 10, while the second pneumatic cylinder 60 and the second pulley member 70 are fixed on a bottom side of the frame 10. The first, second, third, fourth and fifth suction assemblies 40, 50, 80, 90 100 are arranged under the frame 10 and extend forwardly beyond a front face of the fame 10, wherein the fifth suction assembly 100 is located in the midst, the third and fourth suction assemblies 80, 90 are located beside the fifth suction assembly 100, and the first and second suction assemblies 40, 50 are located at outer extremities.

The frame 10 includes a substantially elongated, rectangular body 11 which has a top face 12, an opposite bottom face 13, a rear face 14 and an opposite front face 15. The frame 10 further comprises a flange 16 attached to the rear face 14 for connecting with a robot (not shown), which can move the loading device 1000 between the two sites. A guiding wall 17 is secured to the frame 10 at a position in front of the front face 15 of the rectangular body 11, thereby to form a guiding slot 18 between the guiding wall 17 and the front face 15 of the rectangular body 11.

Figure 3:
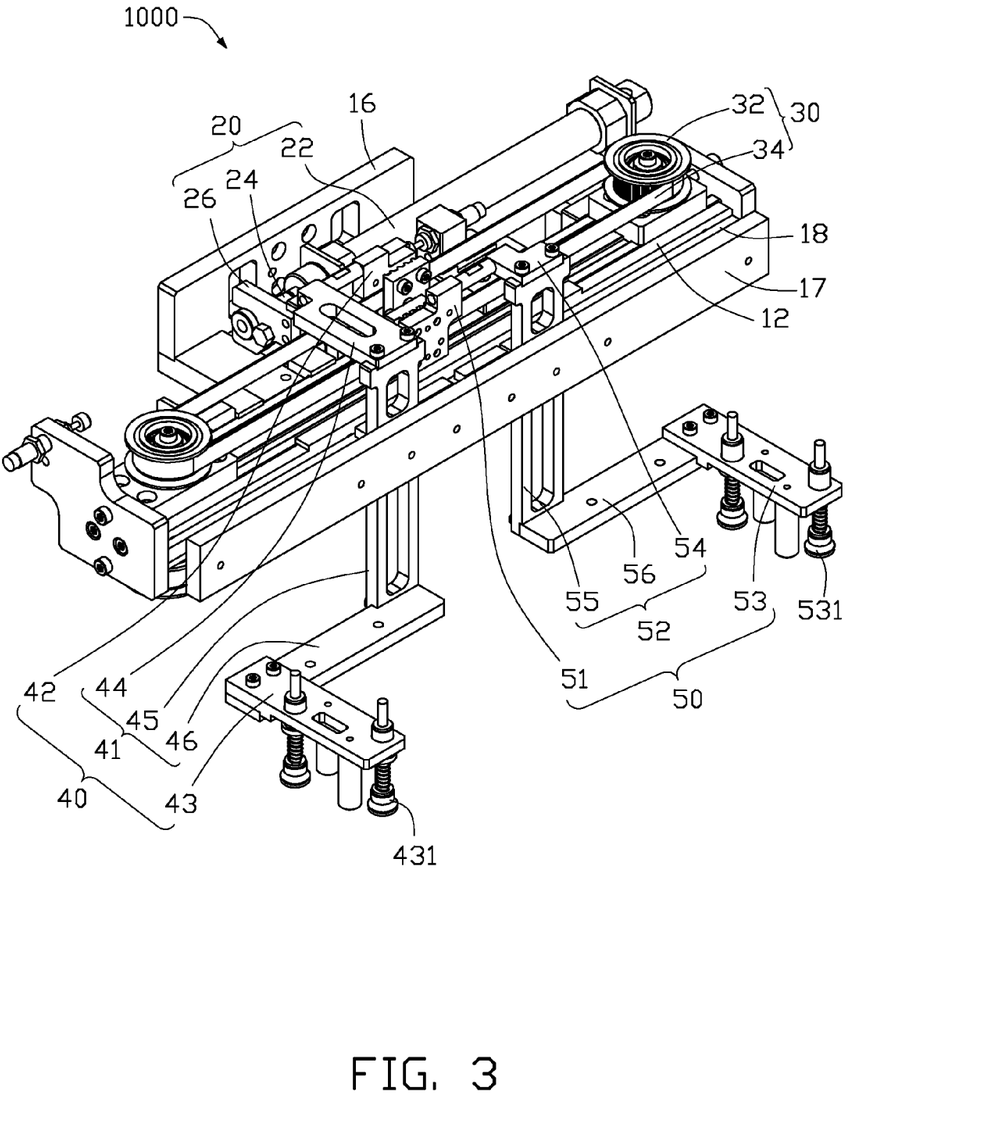
FIG. 3 is a view similar to FIG. 1, with third, fourth and fifth suction assemblies of the loading device removed.

Also referring to FIG. 3, the first pneumatic cylinder 20 can drive the first suction assembly 40 to move away from the second suction assembly 50. The first suction assembly 40 is coupled to the first pulley member 30 at a location near the flange 16 while the second suction assembly 50 is coupled to the first pulley member 30 at a location near guiding wall 17. By such arrangement, when the first suction assembly 40 is driven by the first pneumatic cylinder 20 to move leftward as viewed from FIG. 1, the first pulley member 30 is rotated by an action of the moving first suction assembly 40. The second suction assembly 50 is driven by the rotation of the first pulley member 30 to move rightward so that a distance between the first and second suction assemblies 40, 50 is increased.

In more details, the first pneumatic cylinder 20 is fixed to the top face 12 of rectangular body 11 the frame 10 near the flange 16. The first pneumatic cylinder 20 includes a first cylinder body 22 attached to the top face 12 of rectangular body 11 of the frame 10, a first piston 24 extending outwardly from the cylinder body 22 and a first pusher 26 attached to an end of the first piston 24 distant from the first cylinder body 22.

The first pulley member 30 includes two first pulley wheels 32 and a first substantially annular belt 34 engagingly surrounding the two first pulley wheels 32. A movement of the first belt 34 can drive the first pulley wheels 32 to rotate. An extending direction of the first belt 34 is parallel to an extending direction of the first piston 24.

The first suction assembly 40 includes a first linkage 41, a first clamping portion 42, and a first suction member 43. The first linkage 41 extends through the guiding slot 18 and can slide along the guiding slot 18. The first clamping portion 42 has a first end clamping a section of the first belt 34 at position near the first pneumatic cylinder 20 and an opposite second end secured to both the first pusher 26 and a first end of the first linkage 41. An opposite second end of the first linkage 41 connects with an end of the first suction member 43. The first suction member 43 has a plurality of suction pads 431 thereon, for sucking a first workpiece by vacuum force to move the first workpiece to a desired position. The first linkage 41 includes a first linking plate 44, a first upright plate 45 and a first lateral plate 46. The first upright plate 45 extends through the guiding slot 18 and can slide in the guiding slot 18. The second end of the first clamping portion 42 is secured to an end of the first linking plate 44 of the first linkage 41. Another end of the first linking plate 44 is secured to an end of the first upright plate 45. Another end of the first upright plate 45 is secured to an end of the first lateral plate 46. Another end of the first lateral plate 46 is secured to the end of the first suction member 43. The first linking plate 44 is perpendicular to the first upright plate 45. The first lateral plate 46 is perpendicular to both the first linking plate 44 and the first upright plate 45. The first lateral plate 46 extends along a direction which is parallel to a moving direction of the first piston 24.

The second suction assembly 50 includes a second clamping portion 51, a second linkage 52 and a second suction member 53. An end of the second clamping portion 51 clamps a section of the first belt 34 away from the first pneumatic cylinder 20. Another end of the second clamping portion 51 is secured to an end of the second linkage 52. Another end of the second linkage 52 connects with an end of the second suction member 53 which has a plurality of suction pads 531 for moving a second workpiece to a desired position. The second linkage 52 extends through the guiding slot 18 and can slide therealong. The second clamping portion 51 has an end clamping a section of the first belt 34 at a position away from the flange 16 and another end connecting with an end of the second linking plate 54. Another end of the second linking plate 54 connects with an end of the second upright plate 55 which has another end connects with the end of the second lateral plate 56. Another end of the second lateral plate 56 connects with the end of the second suction member 53. The second linking plate 54 is perpendicular to the second upright plate 55. The second lateral plate 56 is perpendicular to both the second linking plate 54 and the second upright plate 55. The second lateral plate 56 extends from the second upright plate 55 along a direction away from the first lateral plate 46.

When the first cylinder body 22 receives pressured air to drive the first piston 24 to extend outwardly, the first pusher 26 moves away from the first cylinder body 22. Since the first pusher 26 connects with the first clamping portion 42 which in turn connects with the first linking plate 44, the movement of the first pusher 26 causes the first suction member 43 to move away from the first cylinder body 22 and the second suction assembly 50. Furthermore, since the first clamping portion 42 clamps a section of the first belt 34 near the first pneumatic cylinder 20 and the second clamping portion 51 clamps a section of the first belt 34 away from the first pneumatic cylinder 20, the movement of the first pusher 26 further causes a movement of the first belt 34, which in turn causes the second suction assembly 50 to move away from the first suction assembly 40. Thus, a distance between the first and second suction assemblies 40, 50 is enlarged. When first pneumatic cylinder 20 activates to retract the first piston 24 inwardly, the distance between the first and second suction assemblies 40, 50 is decreased.

Figure 4:
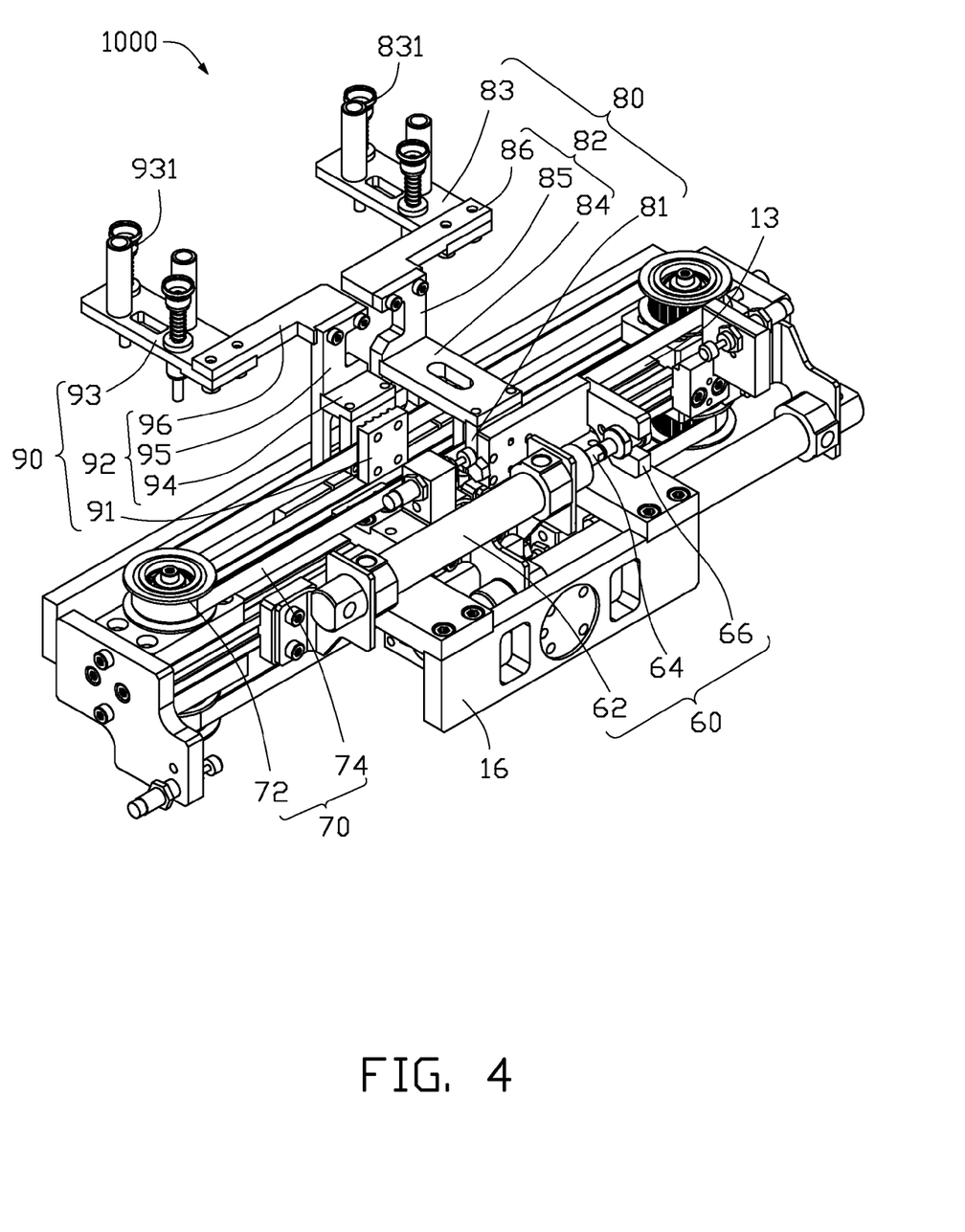
FIG. 4 is a view similar to FIG. 2, with first, second and fifth suction assemblies of the loading device removed.

The second pneumatic cylinder 60 pushes the third suction assembly 80 to move toward the second suction assembly 50. The third suction assembly 80 is fixed to a side of the second pulley member 70, while the fourth suction assembly 90 is fixed to another side of the second pulley member 70. When the third suction assembly 80 is driven by the second pneumatic cylinder 60 to move, the third suction assembly 80 in turn drives the second pulley member 70 to rotate, which causes the fourth suction assembly 90 to move away from the third suction assembly 80 and toward the first suction assembly 40.

Also referring to FIG. 4, the second pneumatic cylinder 60 is fixed to the bottom face 13 of the rectangular body 11 and located near the flange 16. The second pneumatic cylinder 60 includes a second cylinder body 62 fixed to the bottom face 13 of the rectangular body 11, a second piston 64 extending from the second cylinder body 62 and a second pusher 66 fixed to an end of the second piston 64 away from the second cylinder body 62. The moving direction of the second piston 64 is parallel to the moving direction of the first piston 24. The first and second pistons 24, 64 move toward each other when they are extended from their respective cylinder bodies 22, 62.

The second pulley member 70 includes two second pulley wheels 72 and a second, substantially annular belt 74. The second pulley wheels 72 are secured to two opposite ends of the bottom face 13 of the rectangular body 11. The second belt 74 extends around the two second pulley wheels 72 and engages therewith. A movement of the second belt 74 causes the second pulley wheels 72 to rotate. Furthermore, the movement of the second belt 74 is parallel to the movement of the second piston 64 and the movement of the first belt 34.

The third suction assembly 80 includes a third clamping portion 81, a third linkage 82 and a third suction member 83. The third linkage 82 extends through the guiding slot 18 and can move therealong. An end of the third clamping portion 81 clamps a section of the second belt 74 near the second pneumatic cylinder 60. Another end of the third clamping portion 81 is secured to an end of the third linkage 82 and the second pusher 66. Another end of the third linkage 82 connects with an end of the third suction member 83 which has a plurality of suction pads 831 for moving a third workpiece to a desired position. The third linkage 82 has a third linking plate 84, a third upright plate 85, and a third lateral plate 86. The third upright plate 85 extends through the guiding slot 18 and can slide therealong. The third clamping portion 81 has another end thereof connecting with an end of the third linking plate 84 and the second pusher 66. Another end of the third linking plate 84 connects with an end of the third upright plate 85 which has another end connecting with an end of the third lateral plate 86. Another end of the third lateral plate 86 connects with the end of the third suction member 83. The third clamping portion 81 is perpendicular to the third linking plate 84. The third linking plate 84 is perpendicular to the third upright plate 85. The third lateral plate 86 is perpendicular to both the third linking plate 84 and the third upright plate 85.

The fourth suction assembly 90 includes a fourth clamping portion 91, a fourth linkage 92 and a fourth suction member 93. The fourth linkage 92 extends through the guiding slot 18 and can move therealong. An end of the fourth clamping portion 91 clamps a section of the second belt 74 away from the second pneumatic cylinder 60. Another end of the fourth clamping portion 91 is secured to an end of the fourth linkage 92. Another end of the fourth linkage 92 connects with an end of the fourth suction member 93 which has a plurality of suction pads 931 for moving a fourth workpiece to a desired position. The fourth linkage 92 has a fourth linking plate 94, a fourth upright plate 95, and a fourth lateral plate 96. The fourth upright plate 95 extends through the guiding slot 18 and can slide therealong. The fourth clamping portion 91 has another end thereof connecting with an end of the fourth linking plate 94. Another end of the fourth linking plate 94 connects with an end of the fourth upright plate 95 which has another end connecting with an end of the fourth lateral plate 96. Another end of the fourth lateral plate 96 connects with the end of the fourth suction member 93. The fourth clamping portion 91 is perpendicular to the fourth linking plate 94. The fourth linking plate 94 is perpendicular to the fourth upright plate 95. The fourth lateral plate 96 is perpendicular to both the fourth upright plate 95 and the fourth suction member 93.

When the second cylinder body 62 receives pressured air to drive the second piston 64 to extend outwardly, the second pusher 66 moves away from the second cylinder body 62. Since the second pusher 66 connects with the third clamping portion 81 which in turn clamps a section of the second belt 74 near the flange 16 and connects with the third linking plate 84, the movement of the second piston 64 causes the third suction assembly 80 to move away from the second cylinder body 62 and the fourth suction assembly 90 and move toward the second suction assembly 50. Furthermore, the movement of the third clamping portion 81 causes a movement of the second belt 74, which in turn causes the fourth suction assembly 90 to move away from the third suction assembly 80 and move toward the first suction assembly 40. Thus, a distance between the third and fourth suction assemblies 80, 90 is enlarged. When the second pneumatic cylinder 60 activates to retract the second piston 64 inwardly, the distance between the third and fourth suction assemblies 80, 90 is decreased.

Figure 5:
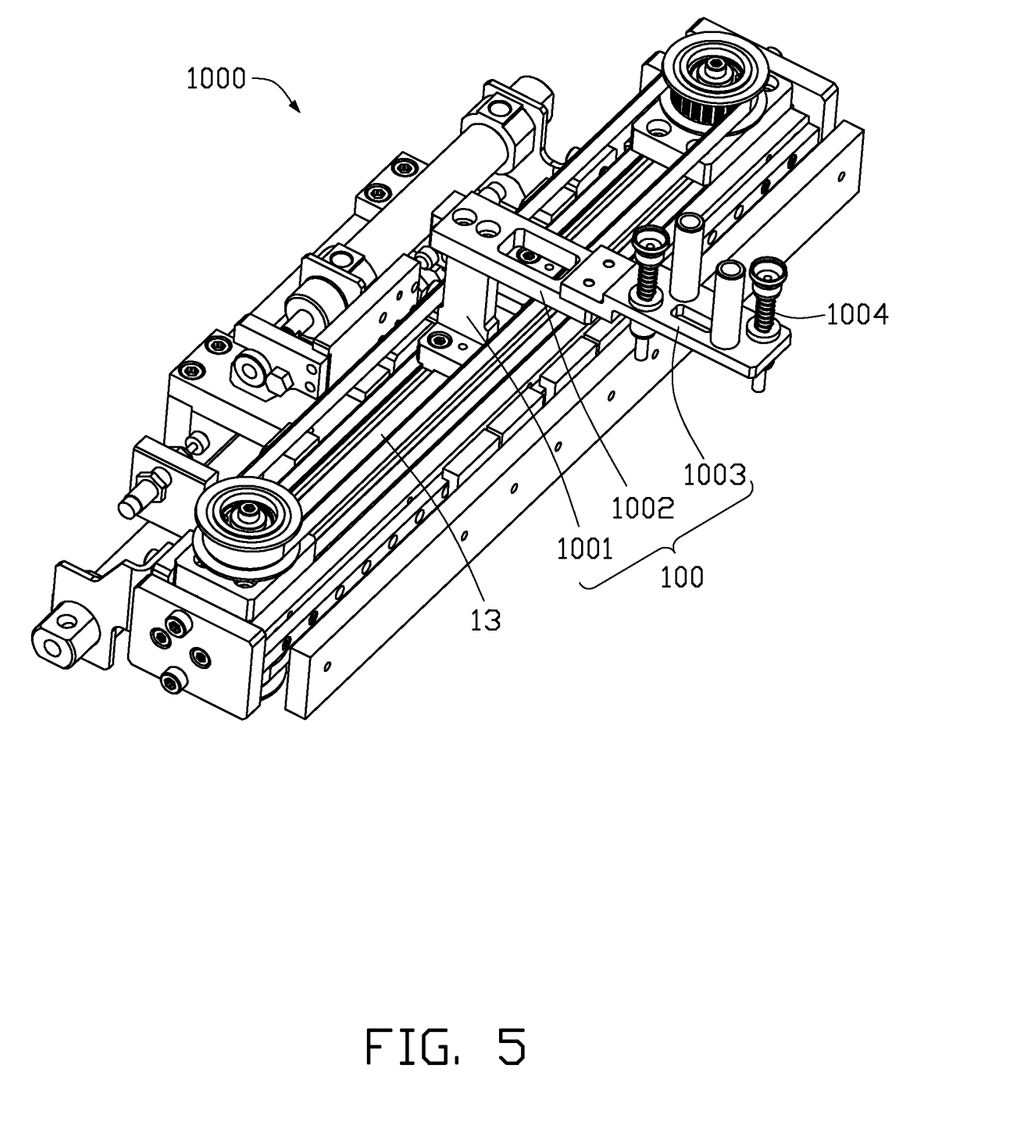
FIG. 5 is a view similar to FIG. 1, viewed from a front-bottom-left aspect, with first, second, third and fourth suction assemblies of the loading device removed.

Also referring to FIG. 5, the fifth suction assembly 100 is fixed at a middle of the rectangular body 11 and includes a fifth upright plate 1001, a fifth linking plate 1002 and a fifth suction member 1003. An end of the fifth upright plate 1001 connects with the bottom face 13 of the rectangular body 11. Another end of the fifth upright plate 1001 connects with an end of the fifth linking plate 1002. Another end of the fifth linking plate 1002 connects with the fifth suction member 1003, which has a plurality suction pads 1004 thereon for moving a fifth workpiece to a desired position. The fifth upright plate 1001 is perpendicularly connected to the bottom face 13 of the rectangular body 11. The fixed position of the fifth upright plate 1001 does not interfere with normal operations of the other components of the loading device 1000. The fifth upright plate 1001 is perpendicular to the fifth linking plate 1002. Since the fifth suction assembly 100 is directly secured to the rectangular body 10, the fifth suction assembly 100 cannot move relative to the rectangular body 10.

Figure 6:
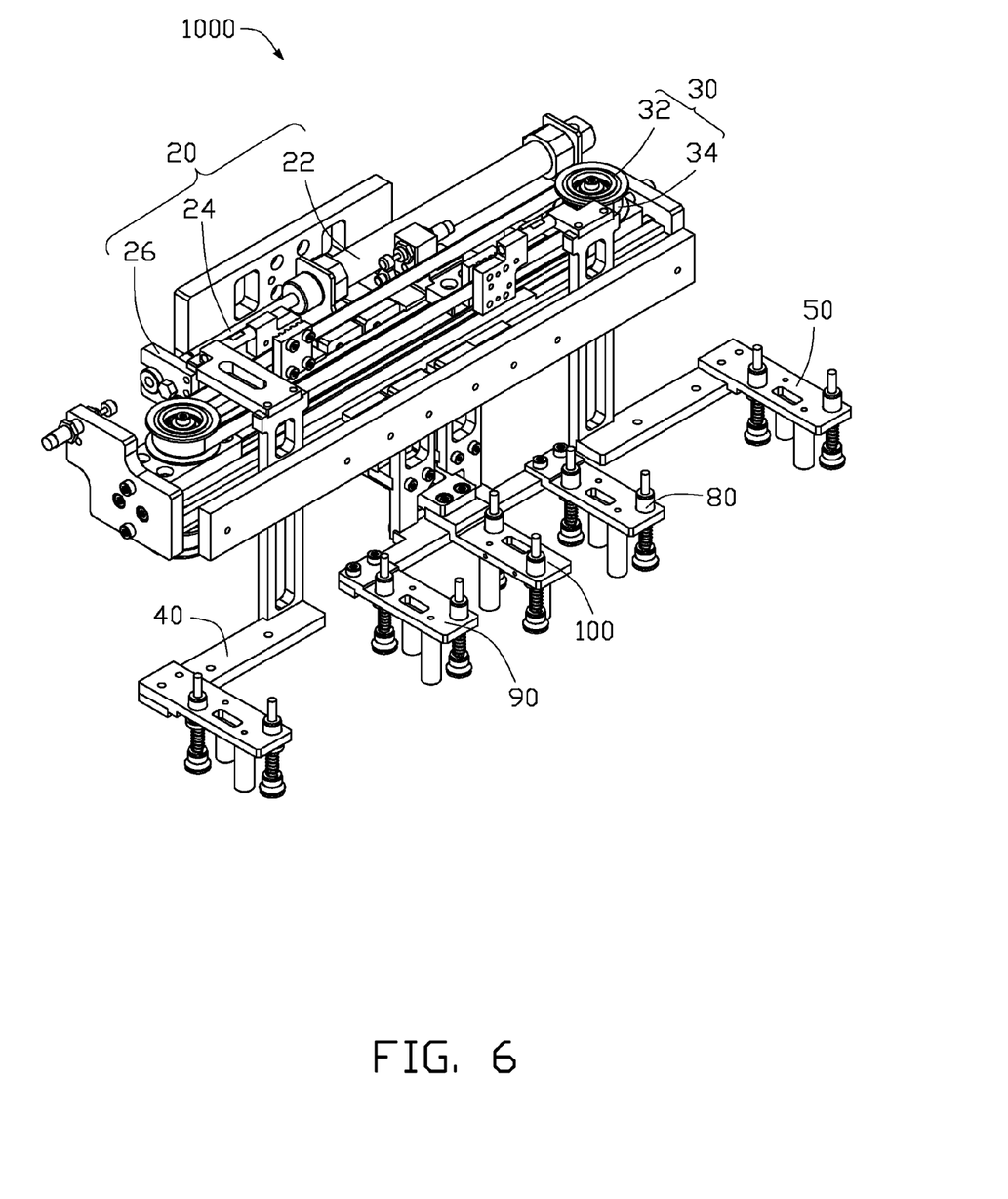
FIG. 6 is a view similar to FIG. 1, with the first and second suction assemblies of the loading device being moved to a second position.

Also referring to FIG. 6, when the distances among centers of the first to fifth workpieces are increased since the sizes of the first to fifth workpieces are increased, to move the workpieces by the loading device 1000, firstly the first pneumatic cylinder 20 and the first pulley member 30 are activated to move the first and second suction assemblies 40, 50 along opposite directions so that they are departed from each other. Then the second pneumatic cylinder 60 and the second pulley member 70 are activated to move the third and fourth suction assemblies 80, 90 along opposite direction so that they are departed from each other. Accordingly, the distances among the first to fifth suction assemblies can be increased to meet the increase of the distances among the centers of the first to fifth workpieces. On the other hand, when the distances among the centers of the workpieces are decreased, firstly the second pneumatic cylinder 60 and the second pulley member 70 are activated to move the third and fourth suction assemblies toward each other so that they are close to each other. Then the first pneumatic cylinder 20 and the first pulley member 30 are activated to move toward each other so that they are close to each other. Accordingly, the distances among the first to fifth suction assemblies are decreased to meet the decrease of the distances among the centers of the first to fifth workpieces. During the adjustment of the distances among the suction assemblies 40, 50, 80, 90, 100, the fifth suction assembly 100 is kept stationary.

In accordance with the present disclosure, by activating the first and second pneumatic cylinders 20, 30, the distances among the first to fifth suction assemblies 40, 50, 80, 90, 100 can be easily, accurately and conveniently adjusted to meet different sized workpieces which have different distances among the centers thereof. Accordingly, the present disclosure can promote the utilization and versatility of the robot having the loading device 1000.

Although not shown in the drawings, it can be understood that a guiding platform can be formed in the guiding slot 18 while each of the first to fourth upright plates 45, 55, 85, 95 can be formed with a protrusion slidably engaging a top face of the guiding platform. Thus, the first to fourth suction assemblies 40, 50, 80, 90 can stably slide along the guiding slot 18 when they are driven by the first, second pneumatic cylinders 20, 30 and the first and second pulley members 30, 70 to adjust the distances thereamong.

It can be further understood that the number of the suction assemblies is not limited to five. The number can be two, three, six, seven, eight or even more.

It is to be understood that the above-described embodiments are intended to illustrate rather than limit the disclosure. Variations may be made to the embodiments without departing from the spirit of the disclosure as claimed. The above-described embodiments illustrate the scope of the disclosure but do not restrict the scope of the disclosure.

What is claimed is:
1. A loading device of a robot comprising:
a frame;

a first pneumatic cylinder fixed to the frame and having an extendable and retractable first piston;
a first pulley member fixed to the frame and having two first pulley wheels and a first belt surrounding and engaging with the two first pulley wheels;
a first suction assembly, having an end coupling with the first piston and a first section of the first belt and another end extending from the frame; and
a second suction assembly having an end coupled to a second section of the first belt and another end extending from the frame, wherein each of the another ends of the first and second suction assemblies having at least a suction pad thereon for moving a workpiece from a site to another site by vacuum force;
wherein when the first piston is extended, the first and second suction assemblies move away from each other to increase a gap formed therebetween, and when the first piston is retracted, the first and second suction assemblies move toward each other to decrease the gap formed therebetween.

2. The loading device of claim 1, further comprising a third suction assembly securely fixed to a middle of the frame, the third suction assembly having an end extending from the frame and having at least a suction pad thereon for moving a workpiece, wherein the first and second suction assemblies are located at two sides of the third suction assembly, respectively.

3. The loading device of claim 2 further comprising:
a second pneumatic cylinder fixed to the frame and having an extendable and retractable second piston:
a second pulley member fixed to the frame and having two second pulley wheels and a second belt surrounding and engaging with the two second pulley wheels; and
fourth and fifth suction assemblies located at outsides of the first and second suction assemblies, respectively, wherein the fourth suction assembly has an end coupled to the second piston and a section of the second belt and another end extending from the frame, and the fifth suction assembly has an end coupled to another section of the second belt and another end extending from the frame, each of the another ends of the fourth and fifth suction assemblies having at least a suction pad thereon for moving a workpiece by vacuum force;
wherein when the second piston is extended, the fourth and fifth suction assemblies move away from each other to increase a distance therebetween, and when the second piston is retracted, the fourth and fifth suction assemblies move toward each other to decrease the distance therebetween.

4. The loading device of claim 3, wherein when interspaces among the first to fifth suction assemblies are to be increased, firstly, the second pneumatic cylinder is activated to extend the second piston to thereby move the fourth and fifth suction assemblies away from each other and then the first pneumatic cylinder is activated to extend the first piston to thereby move the first and second suction assemblies away from each other.

5. The loading device of claim 4, wherein the first pneumatic cylinder and first pulley member are secured to a first face of the frame while the second pneumatic cylinder and second pulley member are secured to an opposite second face of the frame.

6. The loading device of claim 5, wherein the frame defines a guiding slot in a first side thereof, the fourth suction assembly has a linkage extending from the end to the another end thereof through the guiding slot and the fifth suction assembly has a linkage extending from the end to the another end thereof through the guiding slot.

7. The loading device of claim 5, further comprising a flange secured to an opposite second side of the frame and configured for coupling with the robot, the second pneumatic cylinder being located between the flange and the second pulley member.

8. The loading device of claim 7, wherein the section of the second belt where the end of the fourth suction assembly couples with the second belt is nearer to the second pneumatic cylinder than the another section of the second belt where the end of the fifth suction assembly couples with the second belt.

9. The loading device of claim 3, wherein when interspaces among the first to fifth suction assemblies are to be decreased, firstly the first pneumatic cylinder is activated to retract the first piston to move the first and second suction assemblies toward each other, and then the second pneumatic cylinder is activated to retract the second piston to thereby move the fourth and fifth suction assemblies toward each other.

10. A loading device of a robot comprising:
a frame;
a first pneumatic cylinder having an extendable and retractable first piston and a first pulley member mounted on a top face of the frame;
a second pneumatic cylinder having an extendable and retractable second piston and a second pulley member mounted on a bottom face of the frame;
a first suction assembly coupled to the first piston of the first pneumatic cylinder and the first pulley member;
a second suction assembly coupled to the first pulley member;
a third suction assembly coupled to the second piston of the second pneumatic cylinder and the second pulley member;
a fourth suction assembly coupled to the second pulley member; and
a fifth suction assembly secured to a middle of the frame;
wherein interspaces among the first to fifth suction assemblies are adjustable by activating the first and second pneumatic cylinders to extend or retract the first and second pistons thereof; and
wherein each of the first to fifth suction assemblies has at least a suction pad for moving a workpiece by vacuum force.

11. The loading device of claim 10, wherein the frame defines a guiding slot and each of the first to fourth suction assemblies has an upright plate extending in the guiding slot and movable therealong.

12. The loading device of claim 10, further comprising a flange attached to the frame and configured for connection with the robot.

13. The loading device of claim 10, wherein the first suction assembly connects with a first belt of the first pulley member at a position nearer to the first pneumatic cylinder than a position where the second suction assembly connects with the first belt of the first pulley member.

14. The loading device of claim 13, wherein the third suction assembly connects with a second belt of the second pulley member at a position nearer to the second pneumatic cylinder than a position where the fourth suction assembly connects with the second belt of the second pulley member.

15. The loading device of claim 14, wherein to increase the interspaces among the first to fifth suction assemblies, firstly the first pneumatic cylinder is activated to extend the first piston thereof to thereby move the first and second suction assemblies away from each other and then the second pneumatic cylinder is activated to extend the second piston thereof to thereby move the third and fourth suction assemblies away from each other, and wherein the first and second suction assemblies are located at outer extremities of the first to fifth suction assemblies, respectively, while the third suction assembly is located between the first and fifth suction assemblies and the fourth suction assembly is located between the second and fifth suction assemblies.

* * * * *